United States Patent [19]

Thimot

[11] 3,970,214
[45] July 20, 1976

[54] METHOD AND APPARATUS FOR HANDLING COILED SPRINGS

[75] Inventor: George W. Thimot, Marlboro, Mass.
[73] Assignee: Hudson Lock, Inc., Hudson, Mass.
[22] Filed: July 7, 1975
[21] Appl. No.: 593,211

[52] U.S. Cl. .................................. 221/1; 221/160; 198/287; 198/289
[51] Int. Cl.² .......................................... B23Q 7/12
[58] Field of Search ........... 221/163, 159, 160, 156, 221/157, 1; 198/289, 220 BC, 287

[56] References Cited
UNITED STATES PATENTS

| | | | |
|---|---|---|---|
| 3,542,185 | 11/1970 | Gayer | 198/287 |
| 3,679,097 | 7/1972 | Gunter | 221/163 |

*Primary Examiner*—Allen N. Knowles
*Attorney, Agent, or Firm*—John E. Toupal

[57] ABSTRACT

Disclosed is a method and apparatus for feeding individual coiled springs from a bulk source to a point at which they can be utilized in a product assembly operation. The apparatus includes a supply bin for bulk quantities of uniform diameter coiled springs, a receiver for first receiving individual springs from the supply bin and then guiding movement thereof to a point of use, a ramp assembly for delivering the springs from the supply bin to the receiver and defining open channels having a surface curvature that conforms to the outer surfaces of the individual coils of uniform diameter so as to retain the individual springs in positions wherein their axes coincide with a given delivery line during their travel between the supply bin and the receiver, and a drive mechanism for moving the springs between the supply bin and the receiver. A center of gravity responsive removal mechanism automaticaly removes from the ramp any entangled composite group of springs having a center of gravity shifted horizontally from the given delivery line.

17 Claims, 6 Drawing Figures

METHOD AND APPARATUS FOR HANDLING COILED SPRINGS

BACKGROUND OF THE INVENTION

This invention relates generally to a method and apparatus for handling coiled springs and, more particularly, to a method and apparatus for feeding individual coiled springs from a bulk source to automatic assembly equipment.

Coiled springs are essential components of many devices, the assembly of which is complicated by the inherent tendency of such springs to become entangled and form entwined masses. An assembler of such springs typically is required to sort out individual springs which are supplied normally in bulk by spring makers in either boxes or bags. The individually sorted out spring component then is manually loaded into its position in the composite device. Obviously, the labor expense incurred in such assembly operations is significant and adds substantially to the final cost of the finished product.

Although some attempts have been made to automate the assembly of devices utilizing coiled springs, most such attempts have been plagued with problems and unsatisfactory results. For example, a known type of equipment utilizes a spring transfer mechanism such as a vibratory feed to move individual springs out of a supply bin into a feed tube having a slightly larger diameter than the coiled springs and disposed so as to discharge individual springs into a device being assembled. However, entangled groups of springs often become lodged at the entrance of the feed tube thereby blocking access thereto and interrupting the assembly operation. Before the assembly operations can be resumed, the tangled springs blocking the entrance must be manually removed. Again, the cost of labor and the interruption of assembly operations adds significantly to the ultimate cost of the finished products. Furthermore, where more than one feed station is employed, a blockage at a single station will not interrupt operations but will result in the assembly of incomplete units which must be found and either thrown away or unassembled for return to the line.

It is the object of this invention, therefore, to provide an apparatus that can automatically and without interruption feed individual, uniformly oriented coiled springs from a bulk supply thereof to a given assembly point.

SUMMARY OF THE INVENTION

This invention relates to a method and apparatus for feeding individual coiled springs from a bulk source to a point at which they can be utilized in a product assembly operation. The apparatus includes a supply bin for bulk quantities of uniform diameter coiled springs, a receiver for first receiving individual springs from the supply bin and then guiding movement thereof to a point of use, a ramp assembly for delivering the springs from the supply bin to the receiver and defining open channels having a surface curvature that conforms to the outer surfaces of the individual coils of uniform diameter so as to retain the individual springs in positions wherein their axes coincide with a given delivery line during their travel between the supply bin and the receiver, and a drive mechanism for moving the springs between the supply bin and the receiver. A center of gravity responsive removal mechanism automatically removes from the ramp any entangled composite group of springs having a center of gravity shifted horizontally from the given delivery line. By removing from the delivery ramp all entangled groups of springs, a clogging of the receiver is prevented and an uninterrupted flow of uniformly oriented, individual springs is insured.

In a preferred embodiment of the invention, the removal mechanism comprises recesses defined by the delivery ramp and separated from the delivery channels by walls over which the composite groups of springs fall in response to their shifted centers of gravity. A further advantage is derived by locating the delivery ramp directly above the supply bin and providing return passages between the recesses and the bin. Tangled springs falling out of the delivery channels into the removal recesses fall back into the supply bin wherein they can be separated and returned to the ramp.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
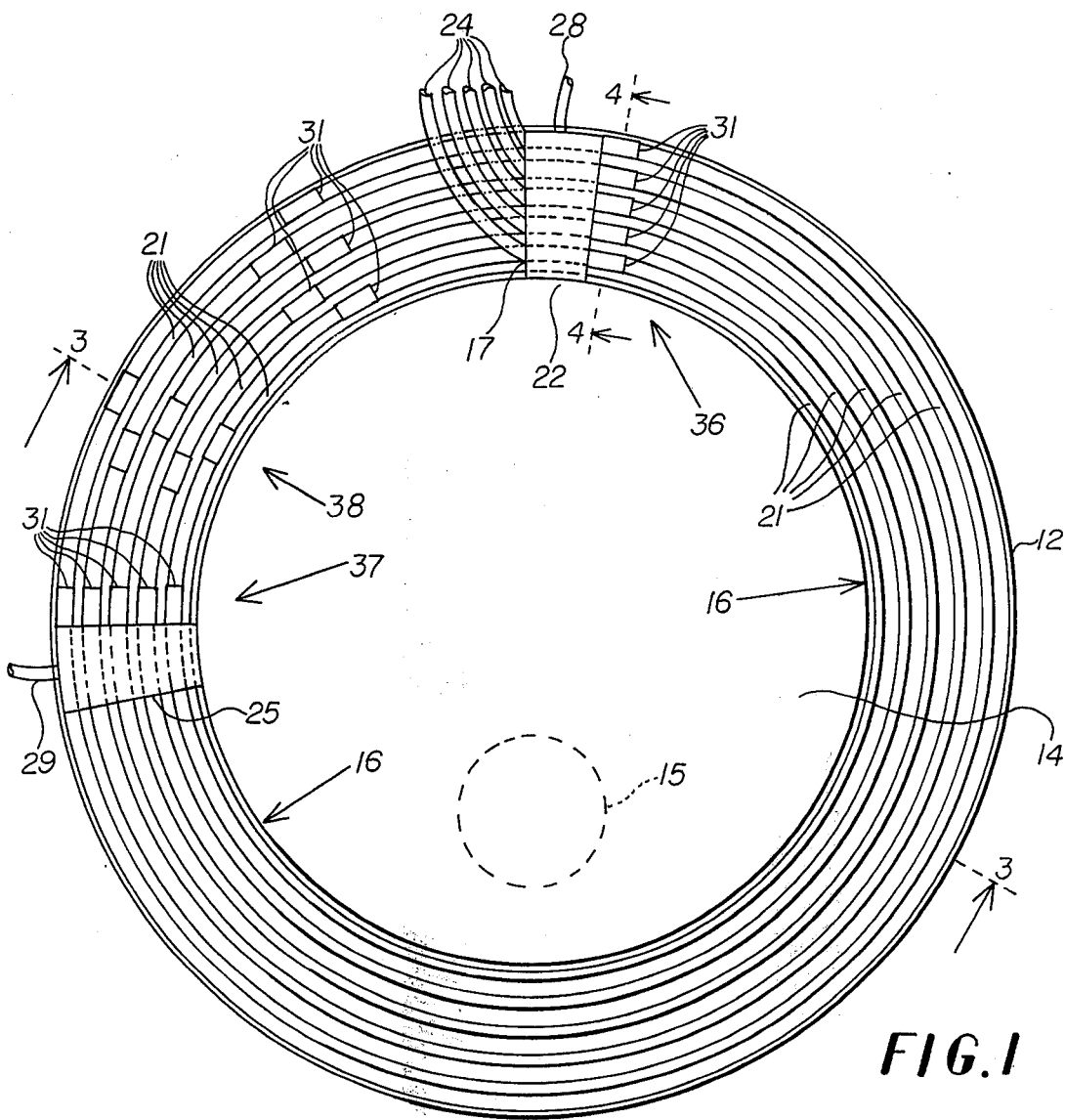
FIG. 1 is a plan view of a preferred embodiment of the invention.
Figure 2:
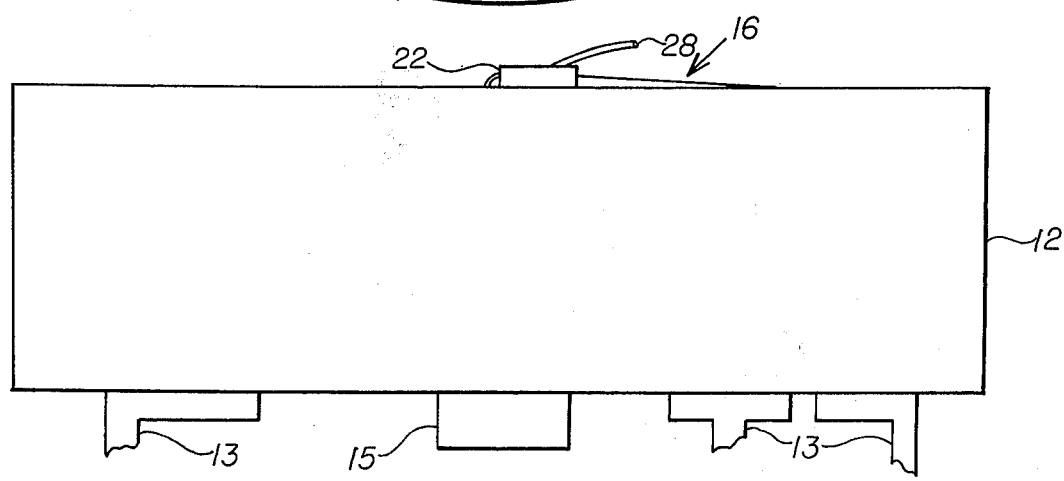
FIG. 2 is a front elevational view of the embodiment shown in FIG. 1.

Referring now to FIGS. 1-4 there is schematically illustrated a preferred spring handling apparatus 11 according to the present invention. The apparatus 11 includes a supply bin 12 mounted on a support structure 13. Operatively coupled to the bottom 14 of the bin 12 is a vibratory drive mechanism 15 of the type, for example, disclosed in U.S. Pat. No. 2,615,184. Supported over the bottom 14 by brackets 19 is a spiral ramp 16 having an entrance edge 17 flush with the bottom surface 14. The ramp 16 is inclined upwardly from the entrance edge 17 in a spiral configuration and terminates at an exit edge 18 located directly above the entrance edge 17. Defined by the ramp 16 are a plurality of parallel, open channels 21 having semi-cylindrical surfaces of uniform diameter.

Disposed adjacent to the exit edge 18 of the ramp 16 is an exit block 22 having a plurality of receiver passages 23 (FIG. 4), one axially aligned with each of the channels 21. Attached to an end of the block 22 opposite the ramp 16 are a plurality of receiver tubes 24, one aligned with each of the passages 23. Opposite ends of the tubes 24 terminate at the spring feed stations of an automatic assembly machine (not shown). A sorting block 25 is supported by the ramp 16 between the entrance edge 17 and the exit block 22. Drilled through the sorting block 24 are a plurality of sorting passages 26 identical to the passages 23 through the exit block 22. All of the passages 23 and 26 have diameters slightly larger than those of the channels 21. Each of the sorting passages 26 is axially aligned with a pair of the channels 21 located on opposite sides of the sorting block 25. Located adjacent to the entrance to passages 23 and 26, respectively, are nozzles 28 and 29 that are connected to a selective pressurized air source (not shown).

Figure 3:
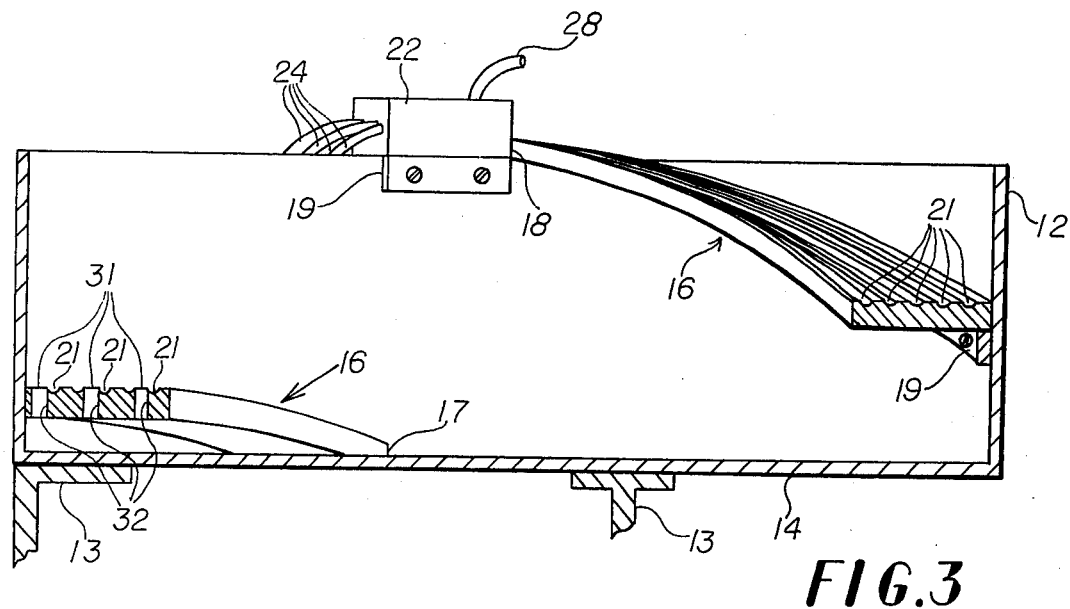
FIG. 3 is a cross-sectional view taken along lins 3—3 of FIG. 1.
Figure 4:
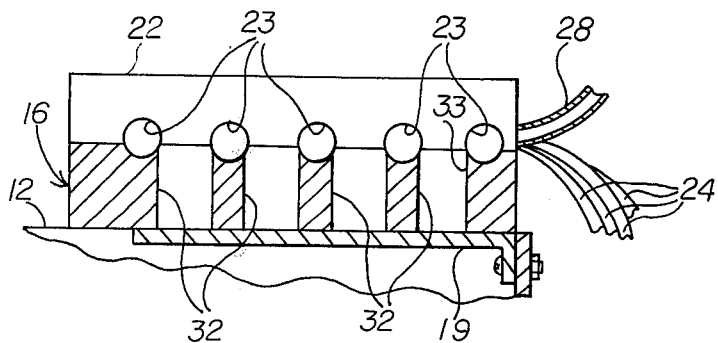
FIG. 4 is a cross-sectional view taken along lines 4—4 of FIG. 1.

The ramp 16 defines a plurality of recesses 31 as shown in FIGS. 1, 3 and 4. The recesses 31 are formed by passages 32 that extend completely through the ramp 16 so as to have lower openings directly above the bottom surface 14 of the supply bin 12. Each of the recesses 31 is located transversely adjacent to one of the channels 21 and is separated therefrom by a wall 33 having a narrow top edge 34. The individual recesses 31 have widths and lengths somewhat greater than those of the springs handled by the apparatus 11 so as to allow movement of certain springs through the passages 32 as described in greater detail below.

As shown in FIGS. 1 and 4 a linear array 36 of the recesses 31 is positioned at the entrance to the exit block 22 with one recess 31 transversely adjacent to each of the channels 21. An identical array 37 of recesses 31 is disposed at the entrance to the sorting block 25. Finally, another pair of arrays 38 and 39, each having a recess 31 adjacent to each of the channels 21, are located between the ramp entrance 17 and the sorting block 25.

During use of the apparatus 11 the supply bin 12 is provided with a bulk quantity of uniform diameter, cylindrically coiled springs needed in the assembly equipment (not shown) communicating with the receiver tubes 24. The vibratory motion of the bottom surface 14 produced by the vibrator 15 tends to partially untangle individual springs. In addition, the shape of the bin's bottom surface 14 and the force lines established by the vibratory mechanism cause the springs to gravitate toward the periphery of the bin 12 and more tangentially therein. Having reached the ramp 16, individual springs roll into the channels 21 with their axes aligned with delivery lines extending between the entrance edge 17 and the exit edge 18 and defined by the axes of the open cylindrical channels 21. Upon reaching the sorting block 25 all individual springs axially aligned within a channel 21 pass through the sorting passages 26 and continue movement toward the exit block 22 providing a supply of separated individual springs at the entrance to the block 22. These springs pass through the receiver passages 23 into the tubes 24 as they are needed by the assembly equipment (not shown).

Figure 5:
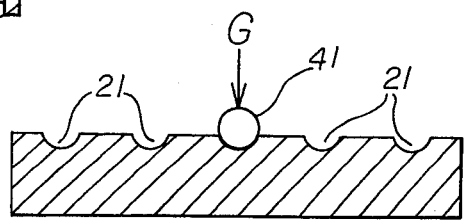
FIG. 5 is a schematic view illustrating one operating condition of the invention.
Figure 6:
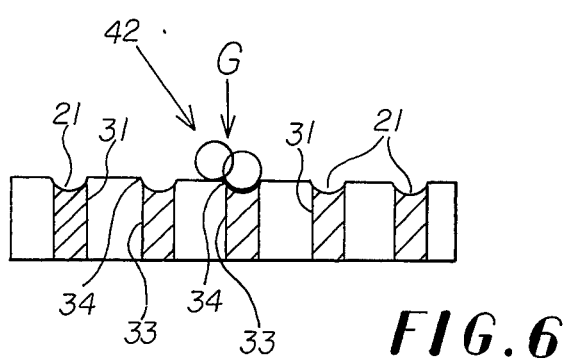
FIG. 6 is a schematic view illustrating another operating condition of the invention.

During migration of the coiled springs between the ramp entrance 17 and the sorting block 25, the channels 21 retain individual separated springs in the desired delivery paths while the recesses 31 remove from the ramp 16 all entangled groups of springs that would plug the sorting passages 26 and thereby interrupt the supply operation. For example, as schematically illustrated in FIG. 5, because of the conforming surfaces of the channels 21 and the coiled springs any individual spring 41 will be retained in a position with its axis parallel to that of the channel by the force of gravity G which is horizontally aligned with the channel's axis. However, as illustrated schematically in FIG. 6, the center of gravity G of any tangled composite group of springs 42 is shifted transversely from the axis of a channel 21 occupied by the group. Consequently upon such a group reaching a position on the ramp transversely adjacent a recess 31, the applied gravitational force produces a torque that rotates the group over the top edge 34 of the wall 33 into the recess 31 and through the passage 32 back into the supply bin 12.

The air nozzle 29 is periodically activated to blow all springs accumulated in front of the sorting block 25 back into the supply bin 12. This action automatically clears the entrances to the passages 26 and prevents clogging thereof in the event that some isolated group of tangled springs has not been removed by the recesses 31. The nozzle 28 is activated to clear the entrances to the passages 23 only in the event of some inadvertent build up of tangled springs that interrupts delivery through the receiver tubes 23.

Obviously, many modifications and variations of the present invention are possible in light of the above teachings. For example, the ramp 16 could form only a single channel or a plurality of completely spaced apart individual channels. Similarly, the removal recesses and return passages could be of greater length and in fact could extend for the full length of the channels. It is to be understood, therefore, that the invention can be practiced otherwise than as specifically described.

What is claimed is:

1. Apparatus for feeding coiled springs and comprising:
    source means for supplying coiled springs;
    receiver means for sequentially receiving individual cylindrical coiled springs of a given coil diameter supplied by said source means;
    ramp means for delivering the springs from said source means to said receiver means, said ramp means defining open channel means having a cylindrical surface curvature that conforms to the outer surfaces of the coils of given coil diameter so as to retain the springs in positions wherein their axes coincide with a given delivery line during their travel between said source means and said receiver means, said ramp means further defining removal means for removing from said channel means any moving entangled composite group of the springs having a center of gravity shifted horizontally from said given delivery line; and
    drive means for moving the springs between said source means and said receiver means.

2. Apparatus according to claim 1 wherein said removal means comprise recesses defined by said ramp means and separated from said channel means by wall means over which said composite groups fall in response to their shifted centers of gravity.

3. Apparatus according to claim 2 including return means for returning to said source means the springs removed from said channel means by said removal means.

4. Apparatus according to claim 3 wherein said return means comprises passages extending between said recesses and said source means.

5. Apparatus according to claim 4 wherein said drive means comprises vibration means for vibrating said ramp means so as to produce a movement of the springs thereon.

6. Apparatus according to claim 5 wherein said source means comprises a bin and said receiver means comprises tube means having a diameter slightly greater than said given diameter.

7. Apparatus according to claim 1 wherein said drive means comprises vibration means for vibrating said ramp means so as to produce movement of the springs thereon.

8. Apparatus according to claim 1 including return means for returning to said source means the springs removed from said channel means by said removal means.

9. Apparatus according to claim 8 wherein said removal means comprise recesses defined by said ramp means and separated from said channel means by wall means over which said composite groups fall in response to their shifted centers of gravity, said ramp means is positioned above said source means, said return means comprise passages extending between recesses and said source means, and said recesses and said passages have dimensions greater than the coiled springs.

10. Apparatus according to claim 9 including sorting means located between said source means and said receiver means, said sorting means comprising receiver passage means of greater diameter than the springs and axially aligned with said channel means.

11. Apparatus according to claim 10 including fluid supply means for periodically removing from said ramp the springs accumulated at said sorting means.

12. Apparatus according to claim 1 wherein said ramp means defines a plurality of said channel means providing for the springs parallel delivery paths between said source means and said receiver means.

13. Apparatus according to claim 12 wherein said removal means comprise recesses defined by said ramp means and separated from said channel means by wall means over which said composite groups fall in response to their shifted centers of gravity.

14. Apparatus according to claim 13 including return means for returning to said source means the springs removed from said channel means by said removal means.

15. Apparatus according to claim 14 wherein said return means comprises passages extending between said recesses and said source means.

16. A method for feeding coiled springs and comprising the following steps:
providing a bulk source of coiled springs of uniform diameter;
providing a receiver means for sequentially receiving individual ones of said cylindrical coiled springs;
providing a ramp means for delivering said springs from said source to said receiver means, said ramp means defining open channel means having a cylindrical surface curvature that conforms to the outer surfaces of the coils of given coil diameter so as to retain the springs in positions wherein their axes coincide with a given delivery line during their travel between said source means and said receiver means;
providing removal means for removing from said channel means any moving entangled composite group of the springs having a center of gravity shifted horizontally from said given delivery line; and
moving the springs along said ramp means between said source and said receiver means.

17. A method according to claim 16 wherein said step of providing removal means comprises forming recesses in said ramp means and separated from said channel means by wall means over which composite groups fall in response to their shifted centers of gravity.

* * * * *